United States Patent [19]
Hawthorn

[11] Patent Number: 5,348,343
[45] Date of Patent: Sep. 20, 1994

[54] AIR BAG DEPLOYMENT BIAS APPARATUS

[75] Inventor: Laura A. Hawthorn, Vandalia, Ohio

[73] Assignee: General Motors Corporation, Detroit, Mich.

[21] Appl. No.: 143,888

[22] Filed: Nov. 1, 1993

[51] Int. Cl.$^5$ .............................................. B60R 21/16
[52] U.S. Cl. .................... 280/730 R; 280/732; 280/743 R
[58] Field of Search ........... 280/728 R, 728 A, 728 B, 280/730 R, 731, 732, 743 R

[56] References Cited

U.S. PATENT DOCUMENTS

| | | | |
|---|---|---|---|
| 3,664,682 | 5/1972 | Wycech | 280/730 R |
| 4,332,398 | 6/1982 | Smith | 280/732 |
| 4,911,471 | 3/1990 | Hirabayashi | 280/732 |
| 4,948,168 | 8/1990 | Adomeit et al. | 280/730 R |
| 5,125,682 | 6/1992 | Hensler et al. | 280/730 R |
| 5,135,255 | 8/1992 | Henseler et al. | 280/730 R |
| 5,160,164 | 11/1992 | Fischer et al. | 280/743 R |
| 5,242,192 | 9/1993 | Prescaro et al. | 280/732 |

FOREIGN PATENT DOCUMENTS 2-158444A 6/1990 Japan .......................... B60R 21/16

*Primary Examiner*—Kenneth R. Rice
*Attorney, Agent, or Firm*—Charles E. Leahy

[57] ABSTRACT

A new and improved apparatus for biasing the direction of air bag deployment includes a box-shaped guide member, preferably of fabric construction, and attached to the air bag module and folded to overlie the folded air bag. The box-shaped guide member has an open bottom and is erected to the box shape upon deployment of the air bag through the air bag opening. The box-shape has an open end wall at the inboard side thereof to define a lateral deployment opening through which the air bag may be deployed laterally, and a top deployment opening through which the air bag may deploy upwardly and rearwardly toward the occupant. The box-shape also includes a top flap which selectively closes off the top deployment opening of the box to bias and divert the deploying air bag through the lateral opening until the top flap is unfolded to an extended position opening the top opening to permit the further deployment of the air bag through the top opening.

4 Claims, 4 Drawing Sheets

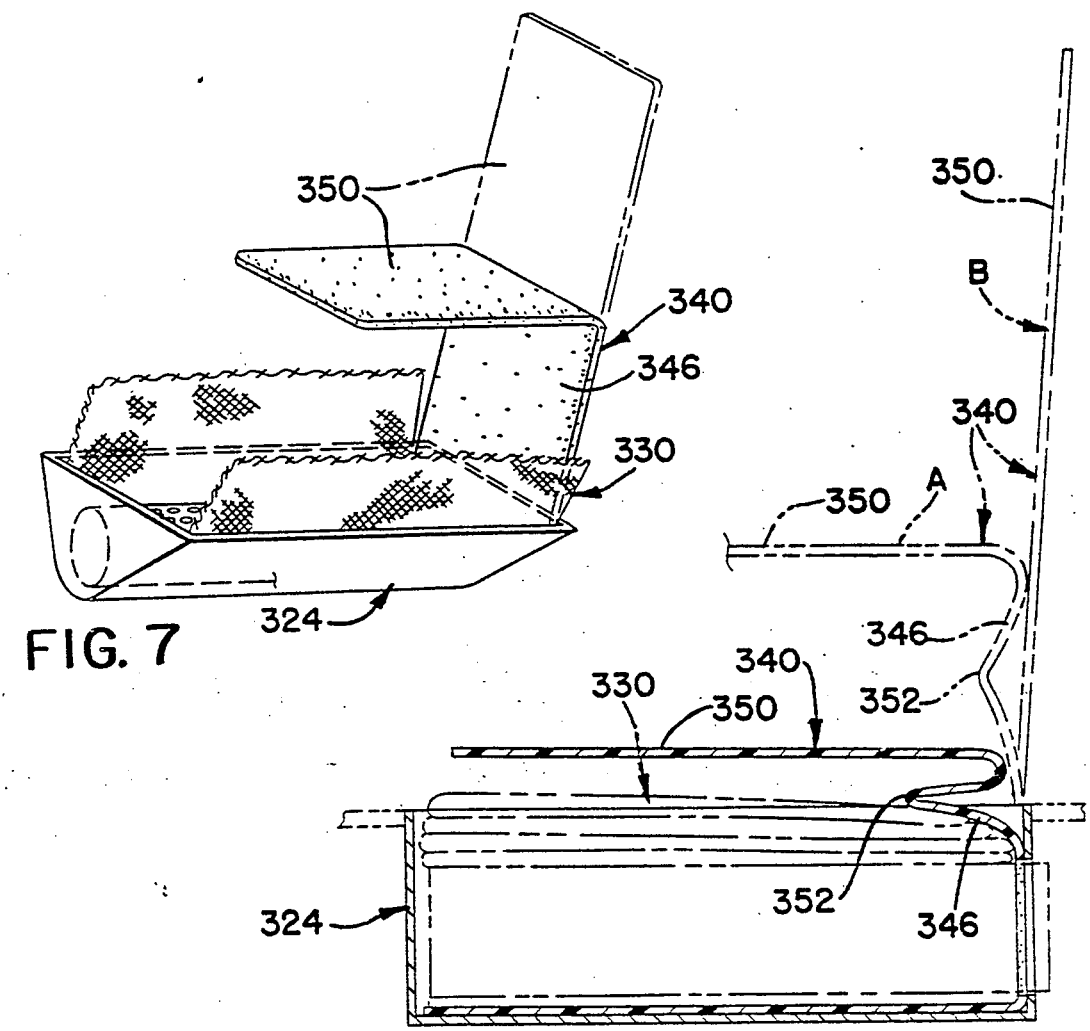
FIG. 7
FIG. 8
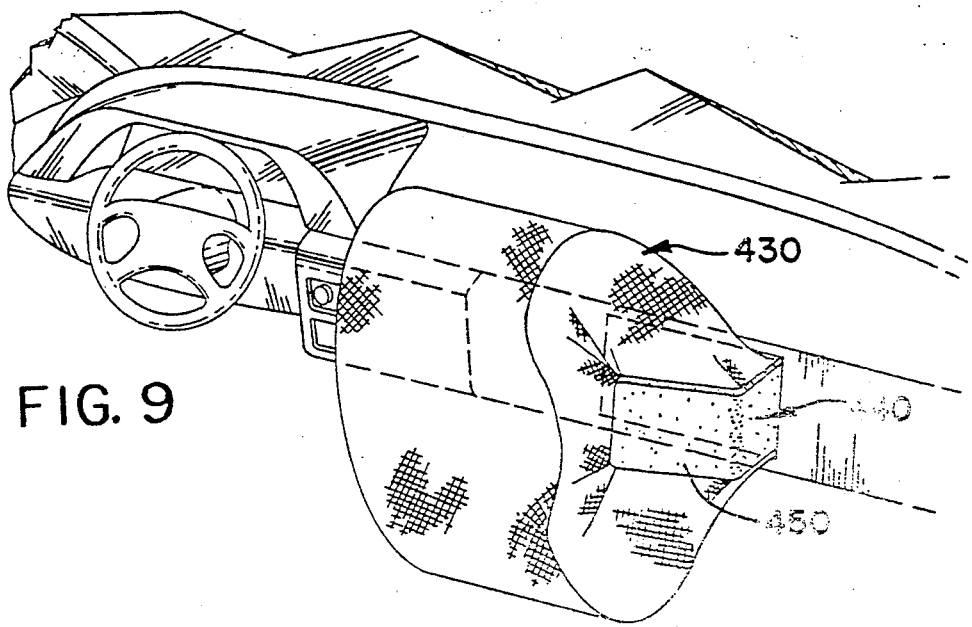
FIG. 9

AIR BAG DEPLOYMENT BIAS APPARATUS

This invention relates to a vehicle air bag and, more particularly, provides apparatus for biasing the direction of a deploying air bag.

BACKGROUND OF THE INVENTION

It is well known in motor vehicles to provide an air bag assembly which is mounted beneath an opening in the instrument panel. A door closes the air bag deployment opening and is moved from the closed position to an open position by the deploying air bag.

The prior art has recognized that the deployment of the air bag toward the occupant seating position is dependent upon factors such as the size and shape of the air bag, the placement of tethers inside the air bag to control the deployed shape of the air bag, the magnitude and duration of inflation pressure and the placement of vent openings in the air bag.

The prior art has also recognized that an external deployment mechanism may be employed to control the deployment of the air bag. For example, co-pending U.S. patent application Ser. No. 07/967,909 filed Oct. 29, 1992, discloses a fabric sleeve which deploys in front of the air bag and functions to control the direction of air bag deployment.

SUMMARY OF THE INVENTION

The present invention provides a new and improved apparatus for biasing the direction of air bag deployment. According to the invention, a box-shaped guide member, preferably of fabric construction, is attached to the air bag module and folded to overlie the folded air bag.

The box-shaped guide member has an open bottom and is erected to the box shape upon deployment of the air bag through the air bag opening. The box-shape has an open end wall at the inboard side thereof to define a lateral deployment opening through which the air bag may be deployed laterally, and a top deployment opening through which the air bag may deploy upwardly and rearwardly toward the occupant.

The box-shape also includes a top flap which selectively closes off the top deployment opening of the box to bias and divert the deploying air bag through the lateral opening until the top flap is unfolded to an extended position opening the top opening to permit the further deployment of the air bag through the top opening.

Accordingly, the object, feature and advantage of the invention resides in the provision of an air bag biasing mechanism which is operative when held in a horizontal folded position to initially deploy the air bag in a lateral direction and then permit further deployment of the air bag in an unbiased upward and rearward direction toward the occupant.

These and other features, objects and advantages of the invention will be apparent upon consideration of the description of the preferred embodiments of the invention and the appended drawings.

DESCRIPTION OF THE DRAWINGS

FIG. 7 is a view similar to FIG. 2 but showing a fourth embodiment of the invention.

FIG. 8 is an elevational view showing the folding of the biasing apparatus of FIG. 7 in solid line, and the progressive unfolding of the biasing apparatus in phantom line.

FIG. 9 is a view similar to FIG. 1 but showing the air bag biasing apparatus of this invention used in conjunction with an air bag mounted on the rearward face of the instrument panel.

DESCRIPTION OF THE PREFERRED EMBODIMENTS

Figure 1:
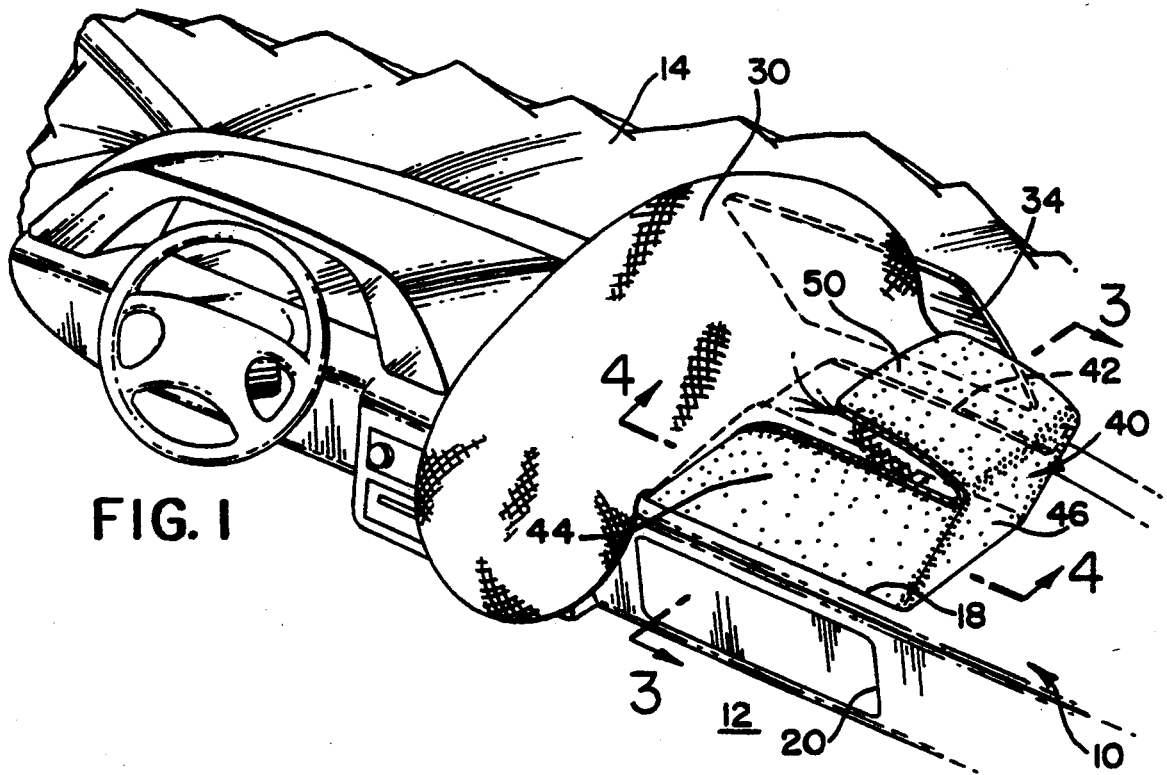
FIG. 1 is a perspective view of a vehicle body instrument panel showing an inflating air bag assembly biased by the biasing apparatus of this invention.

Referring to FIG. 1, it is seen that a motor vehicle includes an instrument panel structure 10 located forwardly of an occupant seating compartment 12 and bounded by the windshield 14. A rectangular shaped air bag deployment opening 18 is provided in the top surface of the instrument panel 10 and a glove box opening 20 is provided on the rear facing wall of the instrument panel.

Figure 2:
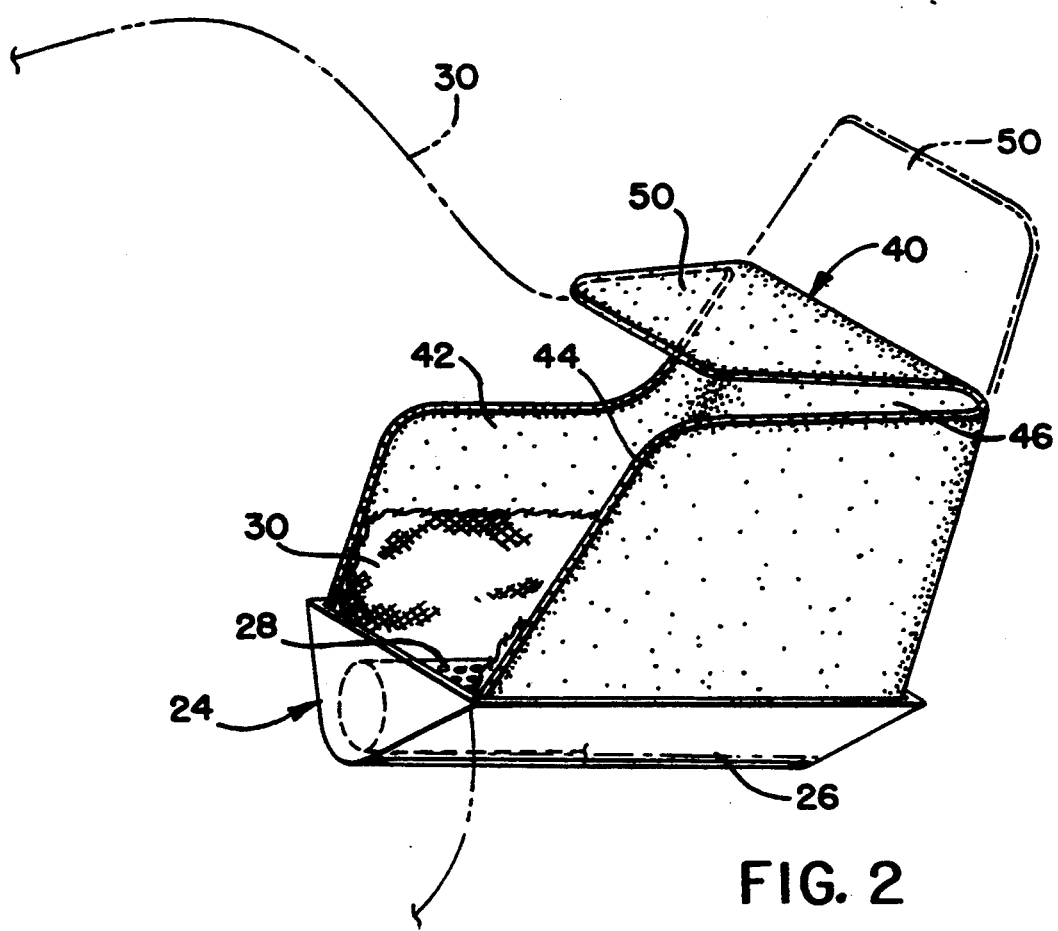
FIG. 2 is a enlarged perspective view showing the invention.

As best seen in FIG. 2, an air bag module assembly 24 is mounted beneath the instrument panel 10 and includes a sheet metal housing 26 enclosing an inflator 28. An air bag 30, sewn of suitable fabric material, is suitably attached within the housing 26 and is normally folded to lie on top of the inflator 28.

FIGS. 1 and 2 show the air bag having been inflated by the inflation gas generated by the inflator 28, which in turn causes the air bag to deploy upwardly through the air bag opening 18. The air bag opening 18 is normally closed by an air bag door 34 which is suitably hingedly attached to the instrument panel and is opened upwardly toward the windshield 14 by the deploying air bag.

As seen in the drawings, the present invention provides a biasing apparatus, generally indicated at 40, which functions to control the direction of air bag inflation. More particularly, it is seen that the inflation biasing apparatus 40 is comprised of a box-shaped construction of fabric or other flexible, foldable material and includes a forward wall 42 and a rearward wall 44 which are connected together by an end wall 46 connecting the outboard edges of the forward wall 42 and the rearward wall 44.

The box-shape is open at an inboard end thereof opposite the end wall 46 as defined by the space between the forward wall 42 and the rearward wall 44. The end wall 46 has an extended top flap portion 50 which extends upwardly beyond the dimensional extent of the forward and rearward walls 42 and 44 so that a top flap portion 50 has a folded condition shown in FIGS. 1 and 2 and an open extended position shown in phantom line in FIG. 2.

As seen in the drawings, the bottommost edges of the box-shape, including the bottom edge of the forward wall 42, bottom edge of the rearward wall 44 and bottom edge of the end wall 46 are suitably attached to the air bag module 24 outside of the attachment of the air bag 30 to the module 24 so that the biasing apparatus 40 can be folded on top of the folded air bag. Accordingly, when the air bag is deployed through the air bag opening 18 on the instrument panel, the biasing apparatus 40 is pushed through the opening ahead of the air bag causing the forward wall 42, rearward wall 44 and end wall 46 to be erected generally vertically as shown in FIGS. 1 and 2, thereby defining a deployment chute.

During some air bag deployments, depending upon the position of the occupant, the top flap portion 50 may be held at the horizontal position of FIGS. 1 and 2 by either the air bag door 34 or by the occupant. When the top flap portion 50 is held at this horizontal position, the deploying air bag is biased leftwardly through the open inboard end of the biasing apparatus 40 so that the bag 30 inflates more inboard of the occupant than would result in those deployments in which the top flap portion 50 is moved to the full open phantom line position of FIG. 2. When the top flap portion 50 reaches the full open position, the air bag deploys in the conventional unbiased upward and rearward direction toward the occupant.

It will be appreciated that the extent and duration of the biasing effect may be varied by controlling the relative size and shape of the forward wall 42, rearward wall 44, end wall 46 and the top flap portion 50.

Figure 3:
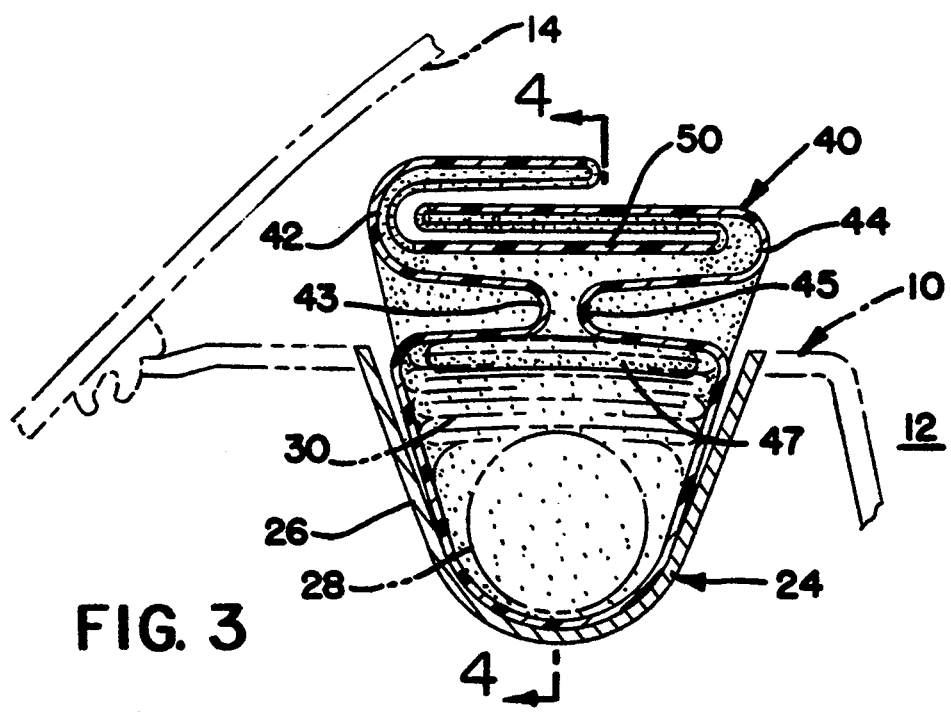
FIG. 3 is a section taken in the direction of Arrows 3—3 of FIG. 1 showing the folding of the air bag biasing apparatus on top the folded air bag.
Figure 4:
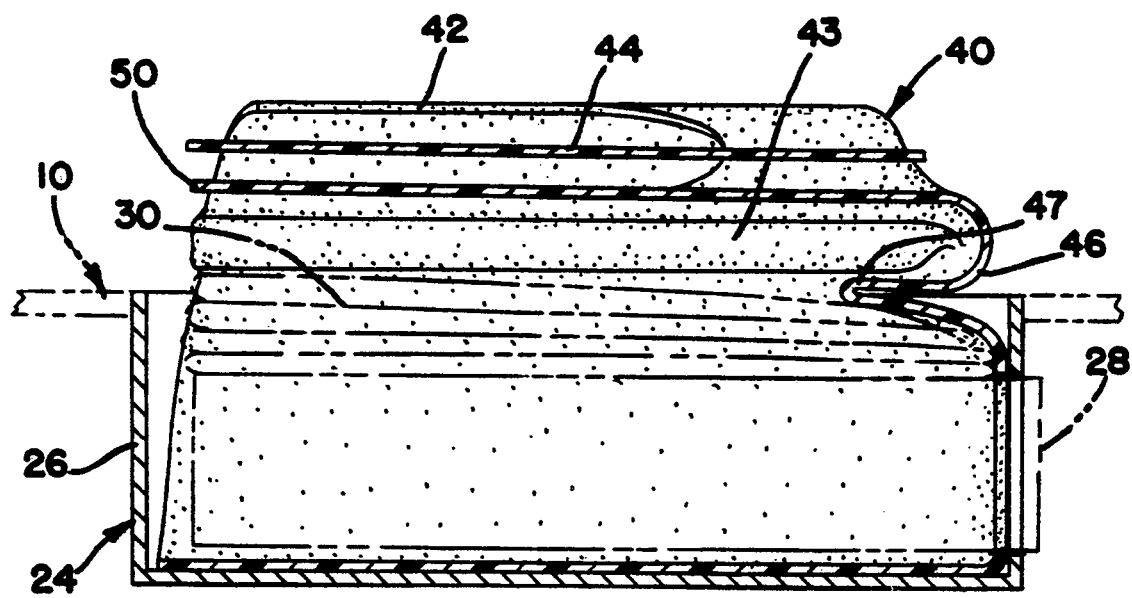
FIG. 4 is a sectional view taken in the direction of Arrows 4—4 of FIG. 3 showing the folding of the air bag biasing apparatus.

FIGS. 3 and 4 show the manner in which the biasing apparatus 40 is folded on top of the air bag module 24. In particular, FIG. 3 shows that the forward wall 42 is pleated inwardly at 43 and the rearward wall 44 is pleated inwardly at 45 to meet at the center of the air bag module 24. FIG. 4 shows that the outboard end wall 46 is also pleated inwardly at 47. This inward pleating of the walls 42, 44 and 46 has the effect of shortening the height of the walls. Accordingly, the remaining unpleated height portion of the end wall 46 can be folded to lie on top of the air bag module 24. Then, the remaining height of the rearward wall 44 is laid on top of the end wall 46. Finally, the remaining height of forward wall 42 is folded down on top of the rearward wall 44.

This particular folding arrangement has been found to provide effective biasing of the air bag, although it is recognized that alternative folding arrangements could be employed and may be desirable and effective depending upon variables such as the size, shape, location and construction of the various elements of the air bag assembly, the vehicle and the occupant seating position.

Figure 5:
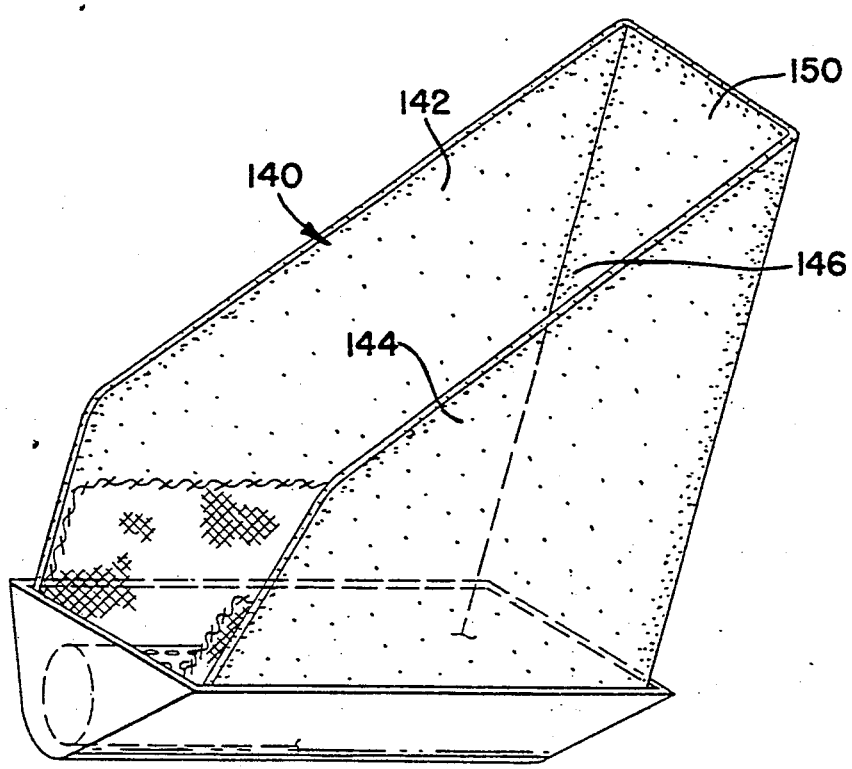
FIG. 5 is a view similar to FIG. 2 but showing a second embodiment of the invention.

FIG. 5 shows a second embodiment of the invention in which the biasing apparatus, designated 140, has a forward wall 142 and a rearward wall 144 which are more trapezoidal in shape to meld into the height of the end wall 146 and its top flap portion 150.

Figure 6:
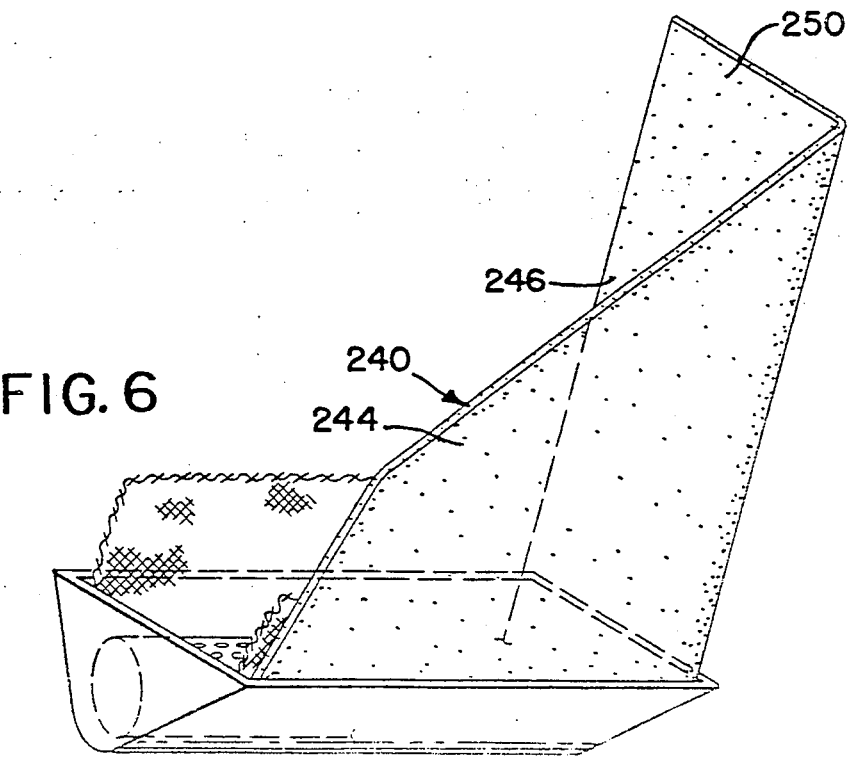
FIG. 6 is a view similar to FIGS. 2 and 5 but showing a third embodiment of the invention.

FIG. 6 shows yet another embodiment of the invention in which the biasing apparatus 240 includes only a rearward flap 244 and an outboard flap 246 with its top flap 250. This embodiment of the invention omits use of a forward wall as had been employed in the embodiments of FIGS. 2 and 5. In the absence of a forward wall, the maintenance of a force on the top flap 150 holding the flap 150 downwardly will permit the air bag to inflate against the windshield while also biasing the inflation in the leftward direction inboard of the occupant through the open end wall.

FIGS. 7 and 8 show a fourth and further simplified embodiment of the invention in which the biasing apparatus, designated 340, has only an outboard end wall 346 and a top flap portion 350.

The solid line position of FIG. 8 shows the biasing apparatus 340 with a portion of its end wall 346 pleated inwardly at 352 so that the top flap 350 is folded on top of the pleated portion 352 and the folded air bag 330.

As the air bag deploys upwardly from the module 324, the biasing apparatus 340 is deployed upwardly to the phantom line position designated "A" in which the pleat 352 has been removed and the end wall 346 has been erected. However, the top wall 350 is shown to remain at its folded position by either the deployment door or the occupant, so that the deploying air bag will be biased to deploy in the leftward direction, as viewed in FIG. 9.

FIG. 8 also shows a phantom line position "B" in which the top flap 350 has unfolded to its upright position so that the biasing effect is removed from the air bag and the air bag is permitted to continue deploying free of the biasing effect applied by the biasing apparatus 340.

It will be appreciated that in each embodiment of the invention, the inward pleating of the end wall to overlie the air bag defines a deployment chute structure in which the deploying air bag will unfold the pleat from the end wall and lift the top flap bodily upwardly away from the air bag module when the top flap is held in the horizontal or near horizontal position by either the air bag door or the presence of an occupant.

Thus, it is seen that the invention provides apparatus effective when held down in a horizontal position for biasing the deployment of an air bag laterally of the occupant position, at least during the initial stage of air bag deployment. The eventual inflation of the air bag will progressively move the air bag door 34 and/or the occupant away from holding down the top flap portion 50 so that the top flap portion 50 can rise to the vertical position and then the air bag inflates in an unbiased fashion.

Although FIG. 1 of the drawings shows the air bag opening disposed on a top surface of the instrument panel, it should be understood that the air bag opening can be located in the rear face of the instrument panel, as shown in FIG. 9, or in low mount position, even lower than the FIG. 9 position. The air bag deployment apparatus 440 will advantageously bias the air bag 430 deployment inboard the occupant, in the event the occupant position holds the air bag biasing top flap 450 on top of the air bag 430.

Each of the embodiments shown in the drawings bias the air bag deployment laterally inboard. However, the biasing apparatus can also be reoriented to bias the air bag in the laterally outboard direction.

The embodiments of the invention in which an exclusive property or privilege is claimed are defined as follows:

1. In a vehicle having an air bag stored in a folded condition forwardly of a seated occupant and deployable by the introduction of pressurized inflation gas into the air bag to an occupant restraining position relative the seated occupant, the improvement comprising, apparatus for selectively initiating the deployment of the air bag laterally of the occupant, said apparatus including a deployment guide member having a normal stored position overlying the folded air bag and deployable toward the occupant by the deploying air bag, said guide member having at least an end wall pleated inwardly to lie on top of the folded air bag, and a top flap hingedly connected to the end wall and folded to lie on top of the pleated end wall in a closed top position so that initial deployment of the air bag unpleats the end wall and permits the top flap to shift toward the occupant and then bias initial deployment of the air bag laterally of the occupant when the top flap is held in the folded position until the eventual unfolding of the top flap permits subsequent unbiased deployment of the air bag toward the occupant.

2. In a vehicle having an air bag stored in a folded condition beneath a vehicle instrument panel positioned forwardly of a seated occupant and deployable through an opening in the panel by the introduction of pressurized inflation gas into the air bag to an occupant restraining position relative the seated occupant, the improvement comprising, a deployment guide member of flexible foldable material including a rearward wall and a side wall attached to the vehicle and folded overtop the folded air bag so that the rearward and side walls are deployed through the panel opening ahead of the deploying air bag to define an air bag deployment chute having a lateral deployment opening opposite an end wall and a top deployment opening which registers with the deployment of opening of the instrument panel, and said end wall having an extended flap portion extending beyond the dimensional extent of the rearward wall and being folded overtop the folded air bag in the stored position so that the flap portion closes the top opening of the chute to bias the air bag deployment through the lateral opening until the flap portion is unfolded to an extended position opening the top opening of the chute to permit further deployment of the air bag through the top opening.

3. In a vehicle having an air bag stored in a folded condition beneath a vehicle panel positioned forwardly of a seated occupant and deployable through an opening in the panel by the introduction of pressurized inflation gas into the air bag to an occupant restraining position relative the seated occupant, the improvement comprising, apparatus for selectively initiating the deployment of the air bag laterally of the occupant, said apparatus including a deployment guide member having a normal stored position overlying the folded air bag and deployable through the panel opening by the deploying air bag, said guide member having a box shape with an open bottom admitting the deploying the air bag and forward, rearward and outboard side walls deployable from the stored position on top the folded air bag to a deployed position, a top flap hingedly connected to the outboard side wall for movement between a closed top position and an open top position, and an open inboard side through which the air bag obtains initial deployment laterally of the occupant when the top flap is held in the closed top position.

4. In a vehicle having an air bag stored in a folded condition beneath a vehicle instrument panel positioned forwardly of a seated occupant and deployable through an opening in the panel by the introduction of pressurized inflation gas into the air bag to an occupant restraining position relative the seated occupant, the improvement comprising, a deployment guide member of flexible foldable material including forward and rearward walls attached to the vehicle and folded overtop the folded air bag so that the forward and rearward walls are deployed through the panel opening ahead of the deploying air bag, said guide member including an end wall connecting the forward and rearward walls at one end thereof so that the forward and rearward walls and the end wall define an air bag deployment chute having a lateral deployment opening at the end of the forward and rearward walls opposite the end wall and a top deployment opening which registers with the deployment of opening of the instrument panel, and said end wall having an extended flap portion extending beyond the dimensional extent of the forward and rearward walls and being folded overtop the folded air bag in the stored position so that the flap portion closes the top opening of the chute to bias the air bag deployment through the lateral opening until the flap portion is unfolded to an extended position opening the top opening of the chute to permit further deployment of the air bag through the top opening.

* * * * *